Patented Aug. 5, 1952

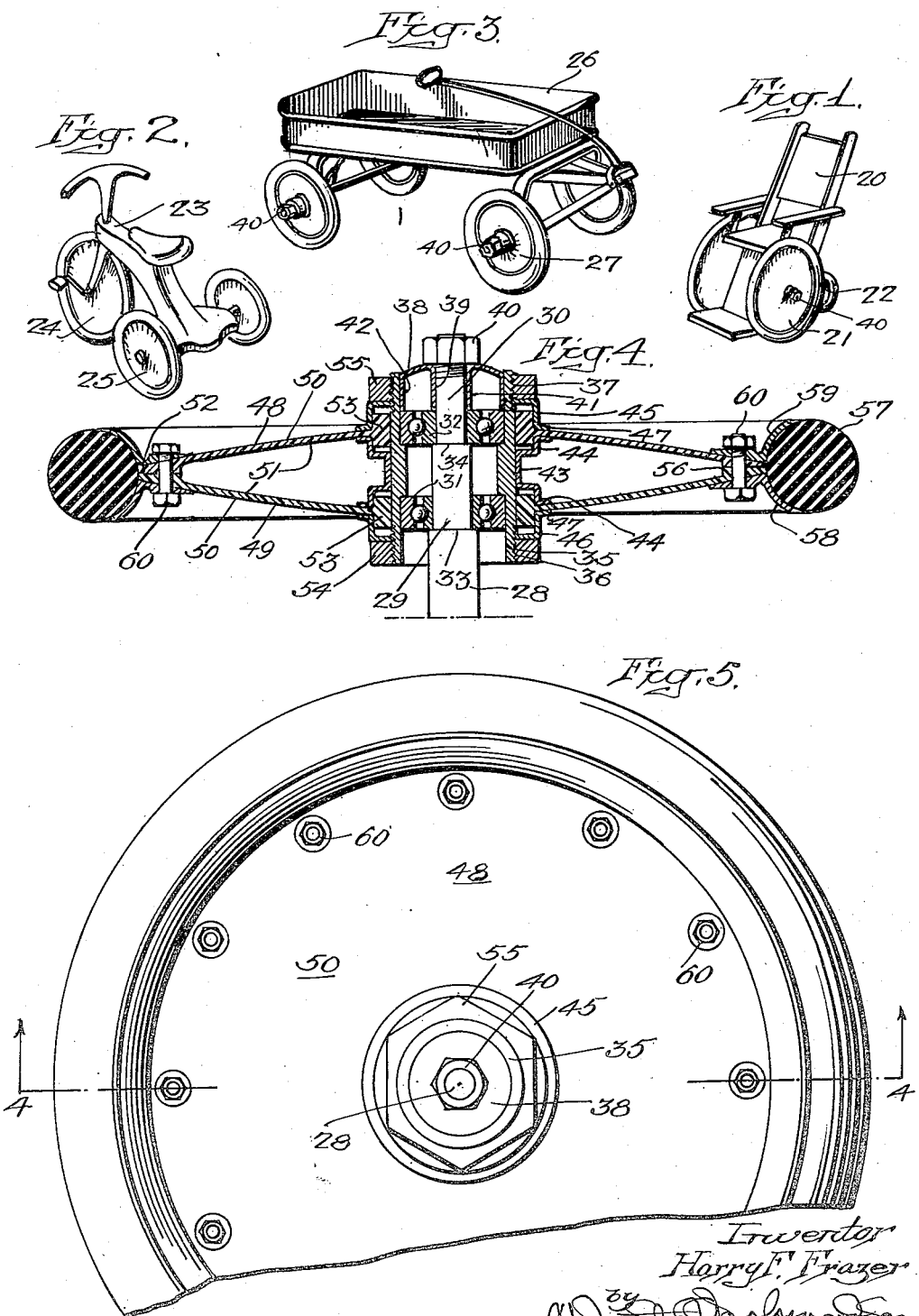

2,606,076

UNITED STATES PATENT OFFICE 2,606,076

DISK WHEEL

Harry F. Frazer, Lewes, Del.

Application August 25, 1947, Serial No. 770,382

1 Claim. (Cl. 301—63)

My invention relates to a wheel for a vehicle such as a wheel supporting a tire for a toy vehicle.

A purpose of my invention is to increase the eye appeal of wheel chairs, toy vehicles and the like, while at the same time rendering wheels adequately light and strong for service.

A further purpose is to manufacture a wheel whose discs are of plastic, suitably transparent or translucent and which are capable of replacement to change the appearance of the vehicle or suit the whim of the user.

A further purpose is to construct a wheel which will be comparatively cheap and easy to manufacture, but will have an attractiveness not heretofore possessed by devices of this kind.

A further purpose is to construct a wheel which can be fully transparent.

Further purposes appear in the specification and in the claim.

In the drawings I have chosen to illustrate one only of the forms of the invention, with applications in different fields, selecting the forms and the applications from the standpoints of convenience in illustration, satisfactory operation and clear demonstration of the principles involved.

Figures 1, 2 and 3 are perspectives illustrating various individual or hand vehicles to which the wheel of my invention may be applied.

Figure 4 is a section of my new wheel on the line 4—4 of Figure 5.

Figure 5 is a fragmentary outside side elevation of the wheel of Figure 4.

Describing in illustration but not in limitation and referring to the drawings:

In the prior art the wheels commonly used on individual or hand vehicles, such as wheel chairs, gocarts, coasting wagons, bicycles, velocipedes and the like have in some cases been of wood or metallic spoked variety but more recently disc wheels of metallic character have been used. These wheels are comparatively heavy and relatively unattractive, relying chiefly on the color of painting for any ornamentation.

I have developed an improved disc wheel which is not only light, easy to manufacture and easy to assemble, but also very novel and attractive in appearance.

One field of anticipated use is in the sick room and in the hospital where the patient is bored by the monotony, and will readily be pleased and impressed by an improvement in the appearance as well as the utility of wheel chairs, rolling trays and the like. This is particularly applicable to veterans' hospitals where very extended periods of hospitalization are required incident to amputation and the like.

In Figure 1 I illustrate a wheel chair 20 having forward wheels 21 and a rear wheel 22, both embodying the construction of the present invention.

The invention is also applicable to toy vehicles such as the tricycle 23 (Figure 2) having a front wheel 24 and rear wheels 25 in accordance with the invention.

In Figure 3 I show a coasting wagon 26 having wheels 27 which likewise conform to the invention.

Each of the wheels is supported on a stud or axle 28 which is conveniently provided with shoulder portions 29 and 30 toward the outer end which support antifriction bearings 31 and 32 abutting against the respective shoulders 33 and 34.

The outside of the bearings are pressed into a hub sleeve 35 threaded at 36 and 37 at the opposite ends. The outer end of the hub inside the sleeve is completed by a hub closure 38 which has an opening 39 for passing the shoulder portion 30 and is held in place by a nut 40 at the outer end of the axle. The closure is engaged against the bearing by a sleeve portion 41, and has adequate clearance at the outside where the sleeve portion 42 rides inside the hub sleeve 35 and close to but clearing from the outer bearing race.

The hub sleeve mounts the clamps for the discs of the present invention. The clamps suitably comprise an inner annulus 43 of metal or the like having at each side a clamping ring 44, and outer clamping washers 45 and 46 each having a clamping ring 47 at its circumferential edge.

Plastic discs 48 and 49 surround the hub sleeve and are gripped by the clamping rings. The discs are preferably formed of transparent or translucent plastic, such as acrylic plastic of which methyl methacrylate is an example. Thus desirably they may also be made out of phenol formaldehyde, urea formaldehyde or other plastics.

One advantage of the acrylic plastic is that the sheet can readily be heated and formed into the dish shape shown, with a convex face 50 on the outside and a concave face on the inside.

The discs are disposed oppositely to one another, so that while they are widely spaced at the hub by the spacer ring 43 they converge at the periphery at 52.

To improve the clamping, each of the discs at its inner circumference is enlarged to form a ring 53 which fits around the hub sleeve and fits inside the clamping rings, so that as shown when the spacer 43 and the clamping washers are brought together the ring 53 is tightly held against any radial movement due to distortion of the wheel.

The structure is united on the threads 36 and 37 by nuts 54 and 55 on the hub sleeve.

When acrylic or other thermoplastic resin is used for the disc, the enlarged rings 53 are conveniently formed simply by heat and shaping the sheet. Likewise with acrylic or other thermoplastic resin, the meeting faces 56 of the disc are desirably united by thermal welding, simply by passing a heating iron around the periphery in contact with the discs.

The wheel is surrounded by a suitable tire which ordinarily need not be pneumatic in the particular installation. I illustrate a solid wire 57 omitting any internal tire or the like which may be employed as well known in the art.

The tire is held in place by rim portions 58 and 59 on opposite sides of the discs and engaging portions of the inner curvature of the tire. The rim portions may be of the same plastic which makes up the discs, but will preferably be of metal. The rim portions are suitably fastened to the discs as by bolt and nut combinations 60 extending clear through the discs and the rim portions at intervals around the circumference.

In operation the wheel is conveniently removed from the axle simply by loosening the nut 40 and pulling off the closure and bearings with the hub and remaining portions of the wheel.

The discs are conveniently assembled by first inserting the fastening ring 43 around the hub sleeve, then slipping the discs from either side onto the hub sleeve against the spacer, next inserting the clamping washers on either side and finally screwing down on the nuts 54 and 55. The discs can then be thermally welded at their perimeter, if this is to be done, and finally the rims, tires and bolts will be inserted at the circumference of the disc.

The transparency of the disc in the preferred embodiment will permit attractive light effects as the wheels rotate, and will make it possible to see through the sides of the wheels when they are stationary. Such effects may be conveniently enhanced by making one or both of the discs of colored material or by applying ornamentation of the discs, which may be different on the inner and outer disc so as to create attractive effects which will vary with speed or rotation. Such ornamental features not only appeal to patients using wheel chairs, but are also very attractive to children.

I find that the appeal of the wheel of the invention can be increased by offering alternative discs, differing in color or ornamentation, so that the user can by a comparatively simple operation substitute one disc for another in the wheel, obtaining a new and attractive appearance. When discs are to be substituted it is better not to employ heat sealing at 56.

It will be evident also that the extent of dishing or other cross sectional feature of the shape of the disc can be varied attractively, and in the case of veterans this may be employed along with the ornamentation as a feature of physical therapy, since the discs, where thermoplastic can readily be shaped under application of heat. Thus the individual patient can have the satisfaction of producing distinctive ornamentation for his wheel chair.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a wheel, a hub, a pair of transparent thermoplastic organic plastic discs respectively oppositely concave, having the concave portions facing one another, surrounding the hub and meeting at their perimeters, means for clamping the discs on the hub in axially spaced relation of the discs, a tire surrounding the perimeters, separate rim portions on opposite sides of the tire and the discs, and bolts extending through the rim portions and the discs, holding the rim portions to the discs and holding the rim portions against the tire, the transparent discs being thermally welded together at their outer edges.

HARRY F. FRAZER.

REFERENCES CITED

The following references are of record in the file of this patent:

UNITED STATES PATENTS

| Number | Name | Date |
|---|---|---|
| 574,499 | Smyser | Jan. 5, 1897 |
| 1,182,250 | Clark | May 9, 1916 |
| 1,461,515 | Burrows | July 10, 1923 |
| 1,531,505 | Roberts | Mar. 31, 1925 |
| 1,631,928 | Doty | June 7, 1927 |
| 1,669,223 | White | May 8, 1929 |
| 1,970,803 | Johnson | Aug. 21, 1934 |
| 2,324,589 | Lytle | July 20, 1943 |
| 2,472,087 | Bierman | June 7, 1949 |

FOREIGN PATENTS

| Number | Country | Date |
|---|---|---|
| 186,717 | Great Britain | 1922 |